United States Patent
Nishiyama

(10) Patent No.: US 8,327,886 B2
(45) Date of Patent: Dec. 11, 2012

(54) CONDUIT REPAIR STRUCTURE

(75) Inventor: Shinichi Nishiyama, Osaka (JP)

(73) Assignees: Ashimori Industry Co., Ltd., Osaka (JP); Ashimori Enginerring Co., Ltd., Tokyo (JP)

( * ) Notice: Subject to any disclaimer, the term of this patent is extended or adjusted under 35 U.S.C. 154(b) by 566 days.

(21) Appl. No.: 12/520,531

(22) PCT Filed: Dec. 19, 2006

(86) PCT No.: PCT/JP2006/325256
§ 371 (c)(1),
(2), (4) Date: Jun. 19, 2009

(87) PCT Pub. No.: WO2008/075406
PCT Pub. Date: Jun. 26, 2008

(65) Prior Publication Data
US 2010/0018598 A1    Jan. 28, 2010

(51) Int. Cl.
*F16L 55/18* (2006.01)
(52) U.S. Cl. .............. 138/98; 138/97; 405/153
(58) Field of Classification Search .............. 138/97, 138/98; 405/153
See application file for complete search history.

(56) References Cited

U.S. PATENT DOCUMENTS

| | | | | |
|---|---|---|---|---|
| 1,167,159 A | * | 1/1916 | Flannery | 138/105 |
| 1,177,311 A | * | 3/1916 | Flannery | 138/158 |
| 1,350,493 A | * | 8/1920 | Goodrich | 52/644 |
| 1,979,238 A | * | 10/1934 | Wilkoff | 405/153 |
| 2,002,987 A | * | 5/1935 | Schulz | 405/153 |
| 2,080,020 A | * | 5/1937 | Wilkoff | 405/153 |
| 2,238,566 A | * | 4/1941 | Perrine | 405/153 |

(Continued)

FOREIGN PATENT DOCUMENTS

JP         03-282095          12/1991

(Continued)

OTHER PUBLICATIONS

International Search Report Issued in PCT/JP2006/32525603/20/2007.

*Primary Examiner* — James Hook
(74) *Attorney, Agent, or Firm* — Edwards Wildman Palmer LLP; Peter F. Corless; George N. Chaclas

(57) ABSTRACT

A conduit repair structure in which solid objects are less likely to accumulate on a conduit bottom and that, even if solid objects accumulate on the conduit bottom, facilitates removal of the solid objects. A hollow frame-like reinforcement body laid substantially along a cross-sectional shape of a conduit (1) is constructed using a reinforcing member (2) having fixing parts (2p) arranged at predetermined intervals on the inner side of the conduit (2). Resin inner face bars (10) are attached to the inner side of the reinforcement body, and a curable filling material is placed in the space formed by the inner face bars (10) and a conduit inner wall (1a) to form a filling material layer (3). A body section (10c) of each inner face bar (10) is formed recessed in its width direction. The recessed shape of the body sections (10c) forms riblets on the bottom of the conduit, and this reduces resistance to water flowing in the conduit. Even in conduits, such as a horseshoe-shaped conduit and a rectangular conduit (box culvert), having flat bottoms and in which objects flow at low speed, the structure allows the objects to flow easier.

11 Claims, 7 Drawing Sheets

U.S. PATENT DOCUMENTS

| | | | |
|---|---|---|---|
| 2,993,656 A * | 7/1961 | Ratkowski | 241/183 |
| 3,504,499 A * | 4/1970 | Taradash et al. | 405/152 |
| 4,585,371 A * | 4/1986 | Jones-Hinton | 405/153 |
| 4,836,714 A | 6/1989 | Matiere | 405/134 |
| 5,927,346 A * | 7/1999 | Majnaric et al. | 138/175 |
| 6,796,334 B2 * | 9/2004 | Ishikawa et al. | 138/98 |
| 2003/0116210 A1* | 6/2003 | Ishikawa et al. | 138/97 |

FOREIGN PATENT DOCUMENTS

| | | |
|---|---|---|
| JP | 08-075042 | 3/1996 |
| JP | 8-224543 A | 9/1996 |
| JP | 08-277992 | 10/1996 |
| JP | 11-256668 | 9/1999 |
| JP | 2001-003437 A | 1/2001 |
| JP | 2001-311387 | 11/2001 |
| JP | 2002-120290 | 4/2002 |
| JP | 2002-310378 | 10/2002 |
| JP | 2003-032821 | 1/2003 |
| JP | 2003-328430 | 11/2003 |
| WO | WO-96/07530 | 3/1996 |

* cited by examiner

CONDUIT REPAIR STRUCTURE

TECHNICAL FIELD

The present invention relates to a conduit repair structure for repairing inner wall of a conduit such as large-diameter sewer pipes and storm drains in which water containing mud and solid matters flows, using inner face bars installed in the conduit, and to a conduit repair structure suitable for horseshoe-shaped and rectangular conduits with a flat bottom.

BACKGROUND ART

As a repair method of existing conduits such as aging sewer pipes, a method to cover the entire inner surface of the conduit with inner face bars (lining materials) has been known (for example, refer to Patent Literatures 1 and 2).

As this kind of repair method, particularly with respect to repair of large-diameter conduits in which human workers can work inside the conduit, the present applicants have proposed a conduit repair method that can simplify repairing works and reduce repairing period without requiring a supporting during the repair (Patent Literature 3), and a repair method that can sufficiently reinforce conduits with severe degradation and deformed conduits wherein sufficient strength cannot be expected, and a conduit repair structure obtainable from such method (Patent Literature 4).

In the above-mentioned conduit repair methods, the inner face bars are made to be continuous in the conduit-longitudinal direction, so that they have an advantage that their flow capacity of the conduit can be increased because of seamless joint in the conduit-longitudinal direction; however, as the repaired length of the conduit increases, the total length of the inner face bars increases, resulting in difficulty in transportation or in manufacturing facility.

In addition, in a conduit repair structure in which a skeleton-like reinforcing body is used, during injection of a curable filling material, accumulated water and air in the conduit are mixed into the space between the inner face bar and the wall surface of the conduit near its bottom, which possibly leads to remaining of unfilled portions. In particular, in cases of conduits with a flat bottom such as horseshoe-shaped conduits and rectangular conduits (box culvert), the mixture of accumulated water and air tends to occur easily between the inner face bar and the wall surface of the conduit near its bottom, and unfilled portions are considered to be formed easily.

Under such circumstances, the applicants have proposed a conduit repair structure with easy handling and good workability at working site, which can solve problems related to transportation and manufacturing facility, by means of the following: inner face bars having a constant length in the conduit-longitudinal direction are installed in a conduit by being mutually contacted in their length and width directions, then they are integrated into a single object in the conduit (Patent Literature 5).

The applicants have also proposed a conduit repair structure wherein a notch is provided on an inner edge of a reinforcement body installed in the gap between the wall surface of the conduit and the inner face bar that covers said wall surface, and the notch serves to pass a curable filling material smoothly in the conduit-longitudinal direction, so that the flow of the curable filling material in the conduit-longitudinal direction is facilitated and development of unfilled portions of the curable filling material is prevented (Patent Literature 6).

FIGS. 11 to 14 show diagrams outlining conventional conduit repair structures related to the above proposed methods.

In these conduit repair methods, a hollow frame reinforcement body consisting of a high-rigidity material (such as steel) is assembled inside a conduit, and an inner face bar (lining material) comprising resin or metal, etc. is attached inside this reinforcement body, then the space formed by this inner face bar and the wall surface of the conduit is filled with a curable filling material (grouting material).

For example, as shown in an example of FIG. 11, when the cross section of an existing conduit is circular, at first a reinforcing member 2 having a shape substantially along the inner wall of the conduit 1a is assembled inside the existing conduit 1. This reinforcing member 2 is assembled by mutually connecting a plurality of divided reinforcing members (in this case, three divided reinforcing members 2a, 2b and 2c) transported through a manhole, etc., to form a ring-like reinforcing member substantially along the inner wall of the conduit 1a as a whole. At the inside of this reinforcing member 2 in the conduit-diameter direction, a plurality of recessed parts for fitting (fitting section 2p) are formed at a predetermined pitch in the circumferential direction, the fitting section being used for fitting a fixing bar 11 with an inner face bar 30 as described later, and there are uniform concavities and convexities formed continuously at its outer edge in the circumferential direction.

In this ring-like reinforcing member 2, through holes 2q passing through in the conduit-longitudinal direction are formed at a constant interval in the circumferential direction; after installation of a plurality of the ring-like reinforcing members 2 inside the conduit at an interval, these ring-like reinforcing members 2 are connected and unified using connecting members consisting of pipe materials, bolts and nuts, etc. (figures not shown), with a certain interval in the conduit-longitudinal direction in the existing conduit, to form a hollow frame reinforcement body as a whole. In addition, at the inner edge of the reinforcing member 2, a notch 2r which is in communication with each of the through hole 2q is formed; therefore, even when the inner face bar 30 is attached, a gap that is in communication in the longitudinal direction of the existing conduit is formed near the inner edge of the reinforcement body 2 that is in contact with this inner face bar 30.

Next, as shown in FIG. 14, fixing bars 11 are attached to each of the fixing parts 2p of the reinforcing member 2 along the conduit-longitudinal direction of the existing conduit 1 in a mutually parallel manner, and inner face bars 30 are attached via these fixing bars 11. As shown in FIG. 12, this inner face bar 30 is a bilaterally symmetric strip-like body with a uniform cross section having a constant length of, for example, approximately 5 cm, which is integrally molded with a strip-like main body 30c and protruding sections for fitting 30a and 30b that are protruding to one side at the both edges of the body section 30c. A distance between the protruding sections for fitting 30a and 30c is identical to the distance (pitch) between the fixing parts 2p formed at inside of the reinforcement body 2; these inner face bars are inserted into the opening of the fixing bar 11 under the condition that the protruding section 30a of one of the mutually adjacent inner face bars 30 is in alignment with the protruding section 30b of the other of the mutually adjacent inner face bars 30. The inner surface formed by these multiple inner face bars 30 in the conduit-diameter direction forms the inner surface of the conduit after repair, as a repaired surface. Meanwhile, in some cases a sealing member 12 for the purpose of waterproof may be installed between the protruding sections for fitting 30a, 30b and the fixing bar 11.

Thereafter, as shown in FIGS. 13 and 14, a curable filling material is injected into the gap between this inner face bar 30 and the inner wall of the conduit 1a, to form a filling-material layer 3. Thus-injected curable filling material fills a compartment of the gap divided by each of the ring-like reinforcing member 2 in the conduit-longitudinal direction, from the bottom side of the already-existing conduit, while flowing through the gap formed by convex-concave of the outer edge of the reinforcing member 2, or the gap formed near the inner edge of the reinforcing member 2 due to the above-mentioned notches 2r, sequentially from one gap compartment to the next gap compartment.

CITATION LIST

Patent Document 1: JP, B, 2614669
Patent Document 2: JP, B, 2742986
Patent Document 3: JP, A, 2002-120290
Patent Document 4: JP, A, 2001-311387
Patent Document 5: JP, A, 2002-310378
Patent Document 6: JP, A, 2003-328430

SUMMARY OF INVENTION

Technical Problem

It is known that solid waste called sedimentary sand accumulates on the bottom of sewer pipes and storm drains; therefore, it has been conventionally desired that a conduit, wherein water containing mud and these solid matters flows, has a structure of hardly accumulating sedimentary sand, and a structure that allows easy cleaning (removal) of such sedimentary sand.

However, in conduits having a flat bottom such as horseshoe-shaped conduits and rectangular conduits (box culvert), because flow rates of matters in the conduits are low and solid matters tend to accumulate easily, the amount of sedimentary sand is often larger than that in conduits with a circular cross section.

Furthermore, because the inner face bar 30 used in the repair method and repair structure mentioned above with reference to FIGS. 11 to 14 should be resistant to the injection pressure of curable filling materials, the bar is required to have high rigidity. To resolve this issue, increasing the thickness of the body section 30c of the inner face bar 30 is considered. However, this makes the inner diameter of the conduit after completion of the repair smaller, which is not preferable.

The present invention has been achieved under these circumstances; it aims to provide a conduit repair structure which provides high strength to the conduit after repair, and with which solid matters do not easily accumulate on the bottom of the conduit and even when they accumulate, their removal is easy.

Solution to Problem

To achieve the above objectives, a conduit repair structure is provided, comprising a hollow frame reinforcement body provided with a plurality of ring-like reinforcing members arranged in the conduit-longitudinal direction of the conduit at a certain interval, said member consisting of a plurality of divided reinforcing members each having fixing parts at a predetermined pitch, and with a plurality of connecting members to mutually connect said plurality of reinforcing members; a plurality of inner face bars existing in the conduit-longitudinal direction of the conduit and forming a repaired surface inside the conduit by being mutually connected in the conduit-circumferential direction via the fixing parts of said reinforcement body, wherein the inner face bar has a protruding section that is directly or indirectly fitted with the fitting section of said reinforcing member, and a body section that is integrally molded with the protruding section and its inner surface in the conduit-diameter direction constitutes said repaired surface; and a filling-material layer comprising a curable filling material filled between said plurality of inner face bars and the inner wall of the conduit; wherein the cross section of the body section of said inner face bar has a recessed part or a raised part, and a plurality of grooves or ribs are formed at least on the bottom of the repaired surface.

Water flowing in a conduit is generally subjected to an especially high drag force near the inner wall of the conduit. It has been confirmed by various experiments that when a convexo-concave shape (riblet) along the water flow is formed on the wall surface of the conduit, generation of vertical vortex is promoted, thereby enabling the control of generation of turbulent boundary layers near the wall so that turbulent drag near the wall can be reduced by 3-10%. Thus, the present invention attempts to achieve the above objectives by forming a riblet along the water flow on the bottom surface of a conduit, thereby reducing the drag force against the flowing water.

Namely, when a riblet consisting of a plurality of grooves or ribs in the conduit-longitudinal direction are formed on the bottom of the conduit wherein water containing mud and solid matters flows, such as large-diameter sewer pipes and storm drains, frictional drag against matters in the conduit is reduced. Accordingly, the conduit of the present invention can be made to be a conduit wherein solid matters hardly accumulate on the conduit bottom and even when they accumulate, their removal is easy.

In this invention, the pitch width of inner face bars placed in the conduit-longitudinal direction (namely, the direction of water flow) is utilized as a repetition width of the riblet. Namely, in a repair method using inner face bars installed at a predetermined pitch width, by making each surface of the inner face bars placed on the bottom of the conduit (repaired surface) to have a recessed shape or a raised shape in its width direction, the above-mentioned drag-reduction effect by the riblet can be achieved.

In addition, by the recessed-raised shape formed on the body section of the inner face bars, the assembled inner face bars show higher resistance to external pressure, thereby increasing its strength against injection pressure, etc. of curable filling materials.

The present invention also relates to a conduit repair structure wherein the corners of the both ends in the conduit-circumferential direction of the inner face bar have an R-shaped form over the entire length of the conduit-longitudinal direction of the conduit so that a groove or rib is formed on the repaired surface.

In addition, the present invention relates to a conduit repair structure wherein the corners of the both ends in the conduit-circumferential direction of the inner face bar is chamfered over the entire length of the conduit-longitudinal direction of the conduit so that a groove or a rib is formed on the repaired surface.

The present invention also relates to a conduit repair structure wherein the inner face bar has a width in the conduit-circumferential direction of 2 or more times of integral multiple of the pitch of the fitting section, and has at least one engagement section which protrudes outward of the conduit-diameter direction at the location corresponding to the fitting section between the protruding sections provided at the both ends in the conduit-circumferential direction of the inner face bar.

With this structure, the number of man-hour during installation of inner face bars can be reduced. Moreover, by means of at least one engagement section provided between the protruding sections of the inner face bars, floating of the inner face bars due to injection pressure during injection of a curable filling material can be prevented, and due to the gap formed between this engagement section and the fitting section of the reinforcement body, the movement of the curable filling material in the conduit-longitudinal direction can be facilitated without installation of notches, etc., which are formed at the inner edge of conventional reinforcement bodies. Accordingly, with the conduit repair structure of the present invention, mixture of accumulated water and air into the space between the inner face bar and the wall surface of the conduit is reduced, and generation of unfilled portions of the curable filling material on the bottom of the conduit can be prevented.

The present invention also relates to a conduit repair structure, wherein the maximum depth of the recessed part or the maximum height of the raised part formed on the body section of the inner face bar relative to the hypothetical reference plane formed by connecting the both ends of the inner face bar in the width direction is between 0.5 and 5.0 mm.

While a riblet requires a certain difference in the height between its recessed/raised parts, when it is applied to sewer pipes and storm drains, a structure to facilitate cleaning (removal) of accumulated sedimentary sand is required; accordingly, the difference in the height is preferably suppressed to 5.0 mm or less.

In addition, the present invention relates to an inner face bar existing in the conduit-longitudinal direction to constitute a conduit repair structure by filling a curable filling material in the space between said inner face bar and the inner wall of the conduit, comprising a protruding section that is directly or indirectly fitted with the fitting section arranged at a predetermined pitch in the ring-like reinforcing members included in the hollow frame reinforcement body; and a body section that is integrally molded with the protruding section, wherein when the protruding section is fitted with the fitting section of the reinforcing member, the inner surface in the conduit-diameter direction constitutes a repaired surface; wherein the cross section of the body section has a recessed part or a raised part to form a groove or a rib on the repaired surface.

Advantageous Effects of Invention

As mentioned above, according to the conduit repair structure of the present invention, by forming a riblet shape along the water flow on the bottom of the conduit to be repaired, a smooth flow inside the conduit can be maintained after the repair, and solid matters hardly accumulate on the conduit bottom, and even when they accumulate, their removal is easy. In particular, in cases of conduits with low flow rate of matters inside the conduit due to flat bottom, such as horseshoe-shaped conduits or rectangular conduits (box culvert), their ability to flow matters can be increased.

In the conduit repair structure wherein inner face bars with a constant length are placed inside of a hollow frame reinforcement body assembled substantially along the inner wall of the conduit, while the inner face bars are in contact with each other in their length and width directions, and a curable filling material is filled into the space formed between these inner face bars and the conduit inner wall, the number of man-hour during installation of the inner face bars can be reduced and the generation of unfilled portions of the curable filling material on the conduit bottom can be prevented, by using the inner face bars having a width of 2 or more times of integral multiple of the pitch of the fitting section of the reinforcement body.

Furthermore, by providing a recessed-raised shape in the body section of the inner face bars, a repair structure with higher strength against external pressure during injection of filling material and after repair of the conduit can be obtained.

DESCRIPTION OF EMBODIMENTS

Hereinafter, embodiments to conduct the present invention are described with reference to drawings.

FIG. 1 shows a cross section in the conduit-longitudinal direction of a conduit repair structure of the first embodiment of the present invention; FIG. 2 is an enlarged schematic diagram of the section A in FIG. 1. FIG. 3 is an example of a cross sectional shape of the inner face bar 10 in this first embodiment. Here, structural members having functions similar to those in the conventional examples are marked with same symbols, and their detailed explanation will be appropriately omitted.

In this conduit repair method of the first embodiment, at first, divided reinforcing members made of a high-rigidity material (such as steel, etc.) and provided with a fitting section $2p$ that has a mostly C-shaped cross section at a predetermined pitch inside the conduit, are assembled along the circumferential direction of the inner wall of the conduit $1a$, so that a ring-like reinforcing member 2 substantially along the cross-sectional shape of the conduit 1 is formed. Then, a plurality of the reinforcing members 2 are placed in the conduit 1 with a certain distance between them in the longitudinal direction, and these reinforcing members 2 are mutually integrated into a single body by means of connecting members (not shown) to form a hollow frame reinforcement body.

Next, fixing bars 11 with an almost C-shaped cross section are attached, in a mutually parallel manner, to each of the fixing parts $2p$ of the reinforcing member 2 along the longitudinal direction of the existing conduit 1, then, the inner face bars 10 are inserted into the opening of the fixing bar 11 via the sealing member 12, under the condition that the protruding section $10a$ of one of the mutually adjacent inner face bars 10, which has a shape similar to letter C, is in alignment with the protruding section $10b$ of the other of the mutually adjacent inner face bars 10. Thereafter, a curable filling material is injected into the gap between this inner face bar 10 and the inner wall of the conduit $1a$, to form a filling-material layer 3. After completion of the repair work, the surface of the body section $10c$ of the inner face bar 10 inside of the conduit-diameter direction forms the inner surface of the conduit, as a repaired surface.

A difference between this conduit repair structure of the first embodiment and conventional ones is that, as shown in FIG. 3, the body section $10c$ of the inner face bar 10, which forms the inner surface of the conduit, has a recessed shape in its width direction (conduit-circumferential direction). In addition, this inner face bar 10 is formed such that the maximum depth Hmax of the above recessed shape relative to the hypothetical reference plane formed by connecting both apexes of corners $10d$ and $10d$ at both edges in the width direction is 2 mm.

Because of this structure, a recessed-raised shape (riblet) along the water flow is formed inside the conduit of this embodiment. Accordingly, in the conduit of this embodiment, smooth flow is maintained after repair and solid matters hardly accumulate on the conduit bottom, and even when they accumulate, their removal is easy.

In particular, in conduits with a flat bottom such as horseshoe-shaped conduits and rectangular conduits (box culvert), flow speed inside the conduit is low and sedimentary sand tends to accumulate easily; however, by forming a riblet structure on the inner surface of the conduit as in this embodiment, matters in the conduit can be flown more easily.

This riblet structure may be formed such that the corners 10d at both edges in the width direction of the body section 10c of the inner face bar 10 have an R-shape, as shown in FIG. 4, or, the corners 10d at both edges in the width direction may be chamfered as shown in FIG. 5. Similar effects may be exhibited by the combination of these shapes with the above recessed shape.

Furthermore, by making the body section 10c of an inner face bar to have a recessed shape in its width direction, the inner face bar 10, after its attachment to the reinforcing member 2, has a raised shape relative to the inner wall of the conduit, i.e., relative to the direction of application of external pressure, so that its resistance to external pressure increases compared to the cases of flat shapes. Moreover, when an external pressure is applied to the inner face bar 10 (for example, a filling material is filled between the inner face bar 10 and the conduit inner wall 1a), adjacent inner face bars 10 push each other in the width direction, thereby improving the sealing characteristic between the fixing member 2 and the inner face bar 10, compared to conventional cases.

Next, the second embodiment is described.

FIG. 6 shows a cross section in the conduit-diameter direction of a conduit repair structure of the second embodiment of the present invention; FIG. 7 is an enlarged schematic diagram of the section B in FIG. 6. FIG. 8 is an example of a cross sectional shape of the inner face bar 20 in this second embodiment.

The conduit repair method according to this embodiment is, similar to the first embodiment, a method wherein a hollow frame reinforcement body is constructed substantially along the cross sectional shape of the conduit 1 using a reinforcing member 2 which is provided with fixing parts 2p at a predetermined pitch inside the conduit, and inner face bars 20 made of resin are attached inside this reinforcement body, then the gap formed between these inner face bars 20 and the inner wall of the conduit 1a is filled with a curable filling material to form a filling material layer 3.

Characteristics of the conduit repair structure of this embodiment are as follows: as shown in FIG. 7, that the inner face bar 20 is formed with a width twice that of the pitch of the fitting section 2a of the reinforcing member 2, and that an engagement section 20c is formed at the center of the width of this inner face bar 20, which protrudes outward of the conduit to be engaged with the fitting section 2a.

The body section 20d (inner surface of the conduit) of the inner face bar 20 having a twice larger width is divided into two parts by the center section 20e in its width direction and each part is formed with a recessed shape in the width direction; and the maximum depth of this recessed shape relative to the respective hypothetical reference plane formed by connecting the center section 20e in the width direction of the body section 20d with the both apexes of the corners 20f and 20f is made to be 2 mm.

Similar to the first embodiment, instead of making a recessed body section 20d of the inner face bar 20 with the twice width, the corners 20f at both edges in the width direction of the inner surface of the conduit 20d are made to have an R-shape (FIG. 9), or, the corners 20f at both edges in the width direction in the body section 20d may be chamfered (FIG. 10). It is also suitable that a continuous groove or rib, etc. in the longitudinal direction may be formed on an inner surface (repaired surface) of the conduit at the center section 20e in the width direction where the fitting section 20c is formed; moreover, the shapes of these corners 20f and the center section 20e in the width direction may be formed in combination with the above-mentioned recessed shape.

Due to this structure, even when a curable filling material is injected, floating of the inner face bars 20 due to injection pressure can be prevented, and flow of the curable filling material in the conduit-longitudinal direction can be facilitated by the gap formed between this engagement section 20c and the fitting section 2p of the reinforcing member 2. Accordingly, the conduit repair structure of the present embodiment can reduce mixture of accumulated water and air in the space between the inner face bar 20 and the inner wall of the conduit 1a, so that it can prevent generation of unfilled portions of the curable filling material at the conduit bottom even in conduits with a flat bottom, such as horseshoe-shaped conduits or rectangular conduit (box culvert).

Furthermore, the conduit inner surface formed by this repair structure can exhibit a riblet effect identical to that in the first embodiment, due to the recessed part formed at the body section 20d of the inner face bar 20. Therefore, the conduit repair structure of this embodiment can also realize a conduit wherein solid matters hardly accumulate on the conduit bottom and even when they accumulate, their removal is easy; this conduit also allows matters in a conduit with a flat bottom to flow more easily.

Moreover, the above conduit repair structure can reduce man-hour of installation works, by making the width of the inner face bars 20 which are installed at the site to be twice that of conventional products. In addition, because filling of a curable filling material can be performed more easily, there is no need to provide notches (symbol 2r in FIG. 11) formed at the inner edge of conventional reinforcing members. This also eliminates the necessity to consider a decrease in the strength due to notches, thereby enabling the design of the width in the conduit-diameter direction and the thickness in the conduit-longitudinal direction of the reinforcing member 2 to be both smaller than those in conventional products, making processing of their shapes easier. Accordingly, due to these effects, the conduit repair structure of this embodiment can reduce its cost compared to conventional products. In the above-mentioned example, an embodiment wherein the width of an inner face bar is formed twice as large as conventional products has been described; however, the invention is not limited to such example, and the width can be appropriately designed depending on the diameter of a conduit. For example, it can be formed with 2 to 10 times (such as 3 or 4 times) larger than conventional products. In this case, the engagement section 20c may be provided at multiple locations depending on the width of the inner face bar.

In the above-described two embodiments, examples of conduit repair structure with resin inner face bars are explained; however, the inner face bar of the present invention is not limited to resin bars, and hard materials with water resistance such as metals can be used. The shape of the inner face bar may also be that extending in the conduit-longitudinal direction (long inner face bars, etc.).

In addition, the present invention can naturally be applied to conduits with various cross-sectional shapes, and in addition to repair existing conduits, it can also be applied to newly-constructed conduits wherein inner face bars are installed as the conduit inner surface.

REFERENCE SIGNS LIST

Figure 1:
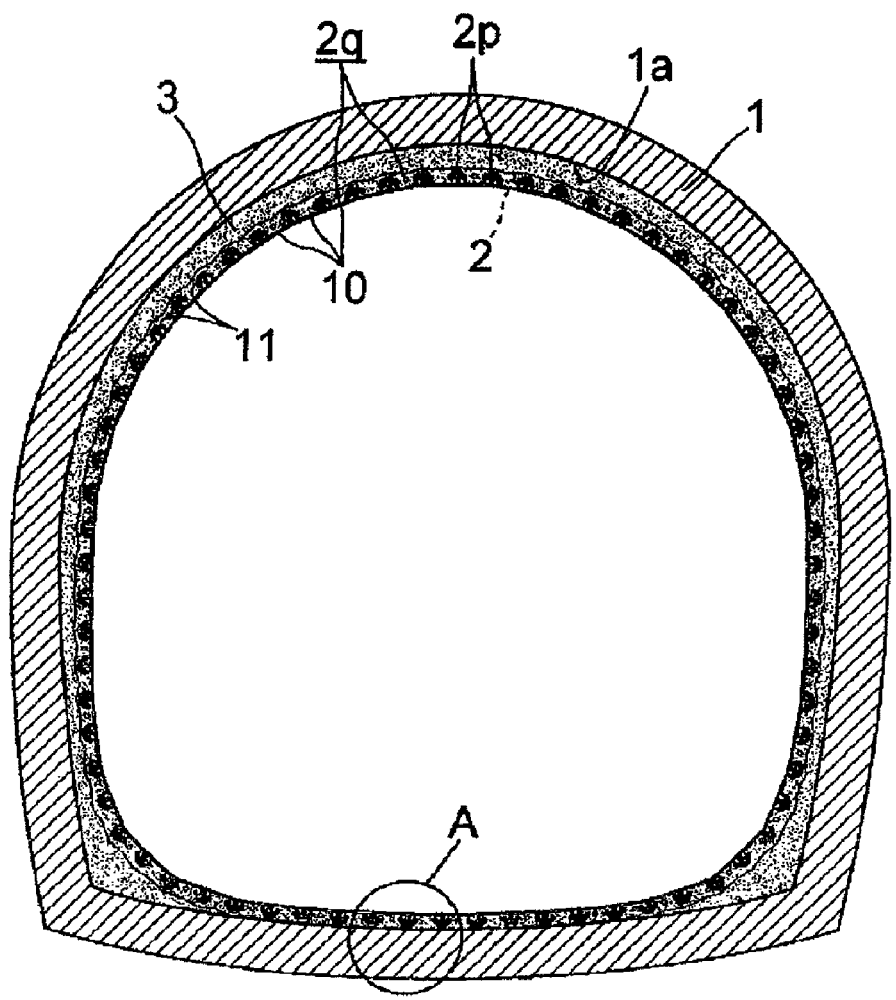
FIG. 1 A cross sectional diagram in the conduit-diameter direction of a conduit repair structure of the first embodiment of the present invention.
Figure 2:
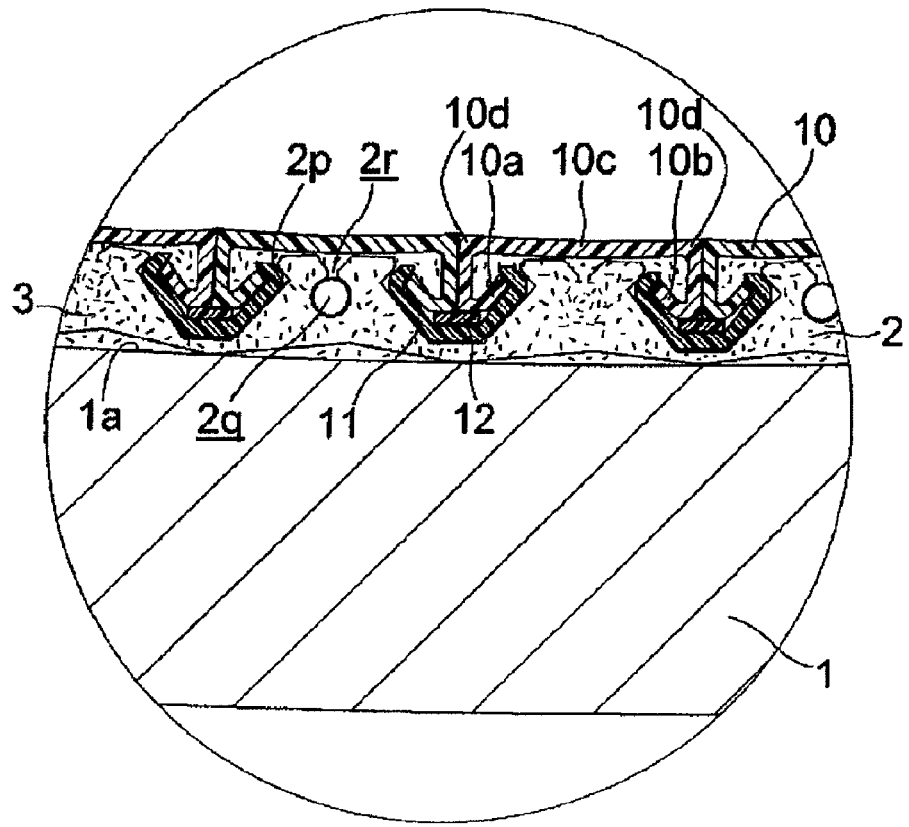
FIG. 2 An enlarged schematic diagram of the section A in FIG. 1.
Figure 3:
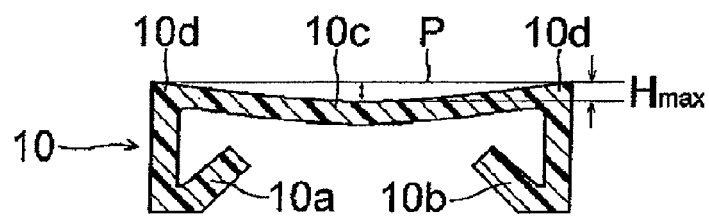
FIG. 3 A diagram of an example of the cross sectional shape of the inner face bar 10 in the first embodiment of the invention.
Figure 4:
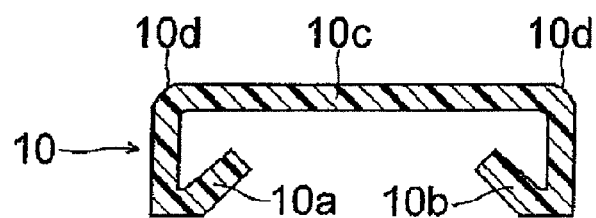
FIG. 4 A diagram of another example of the cross sectional shape of the inner face bar 10 in the first embodiment of the invention.
Figure 5:
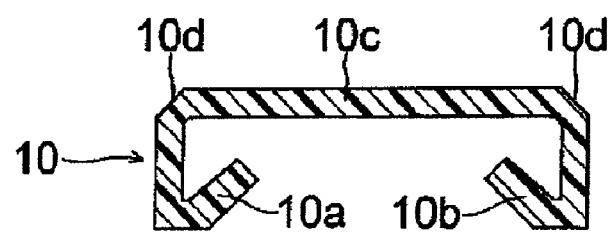
FIG. 5 A diagram of a still another example of the cross sectional shape of the inner face bar 10 in the first embodiment of the invention.
Figure 6:
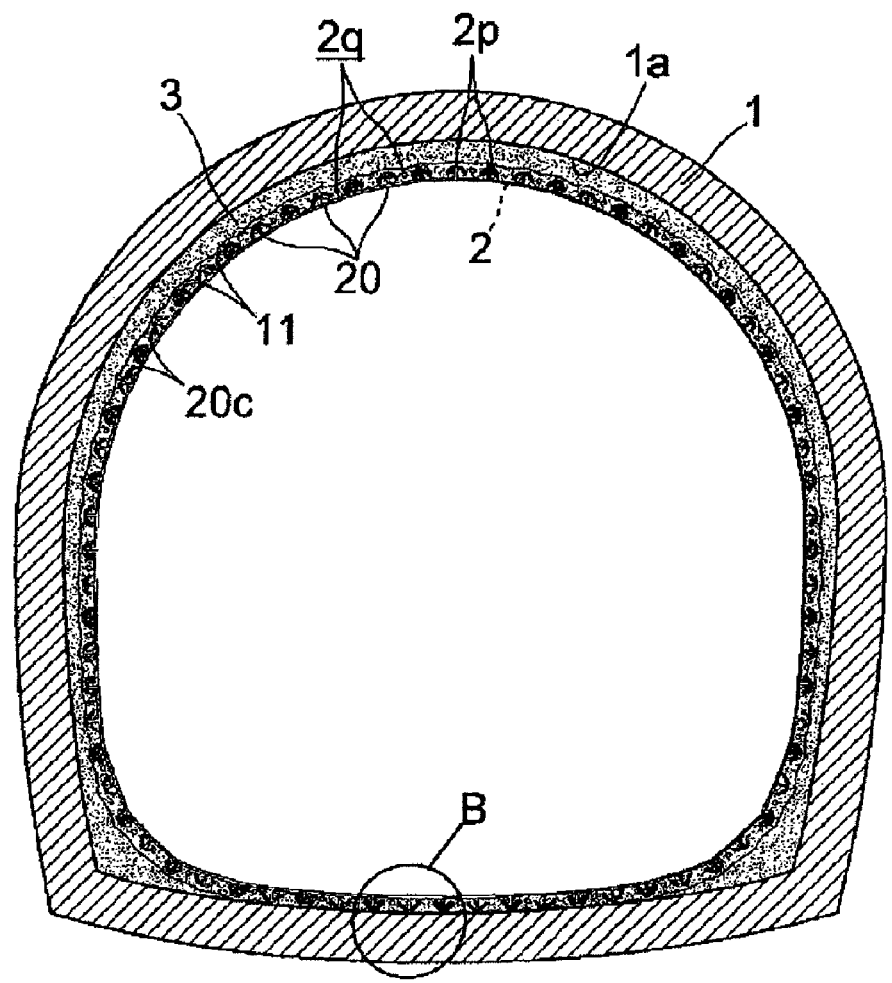
FIG. 6 A cross sectional diagram in the conduit-diameter direction of a conduit repair structure of the second embodiment of the present invention.
Figure 7:
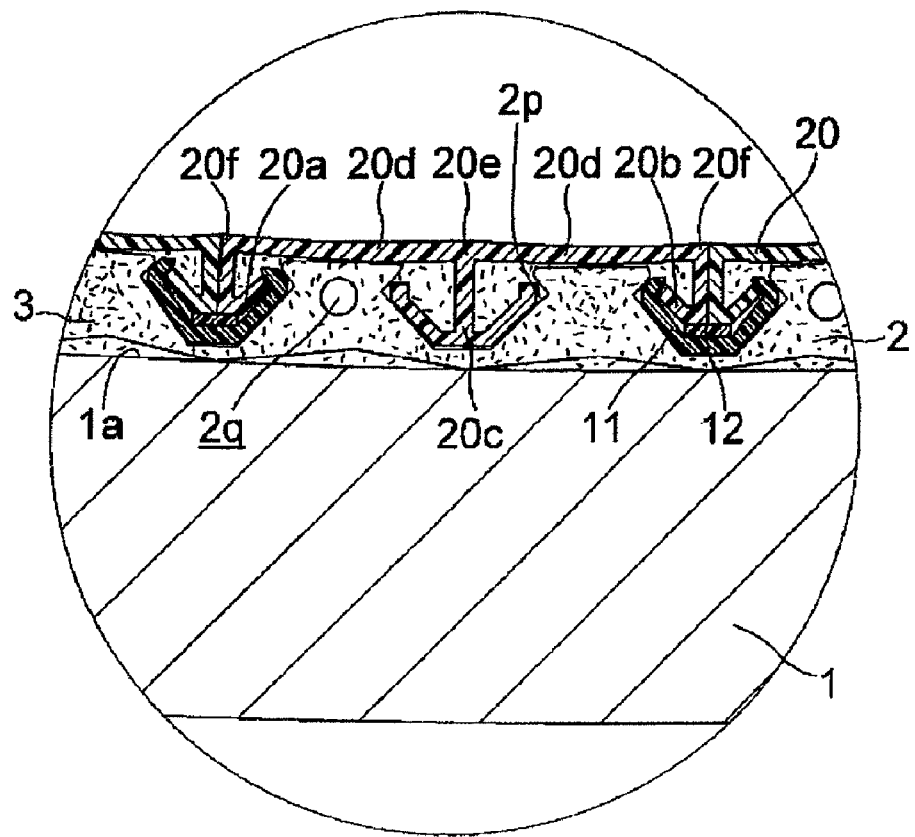
FIG. 7 An enlarged schematic diagram of the section B in FIG. 6.
Figure 8:
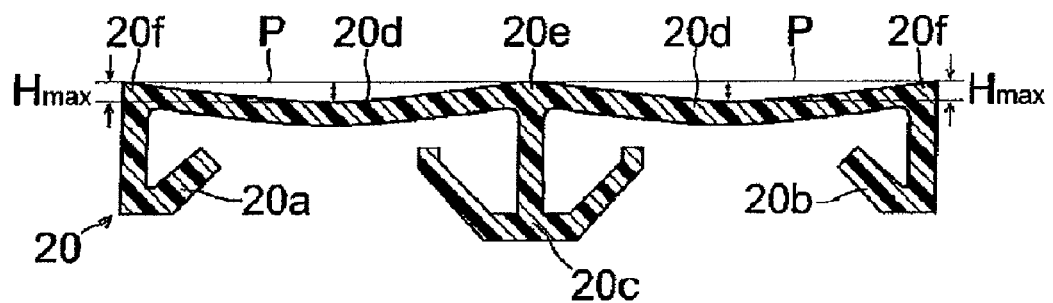
FIG. 8 A diagram of an example of the cross sectional shape of the inner face bar 20 in the second embodiment of the invention.
Figure 9:
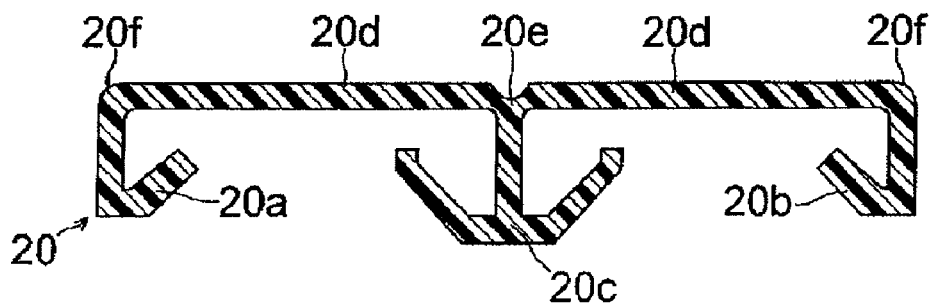
FIG. 9 A diagram of another example of the cross sectional shape of the inner face bar 20 in the second embodiment of the invention.
Figure 10:
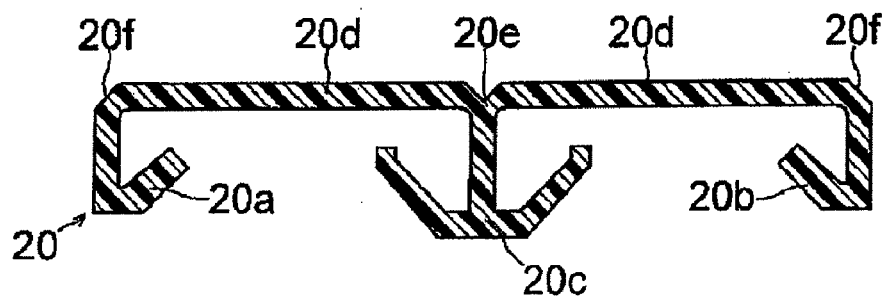
FIG. 10 A diagram of a still another example of the cross sectional shape of the inner face bar 20 in the second embodiment of the invention.
Figure 11:
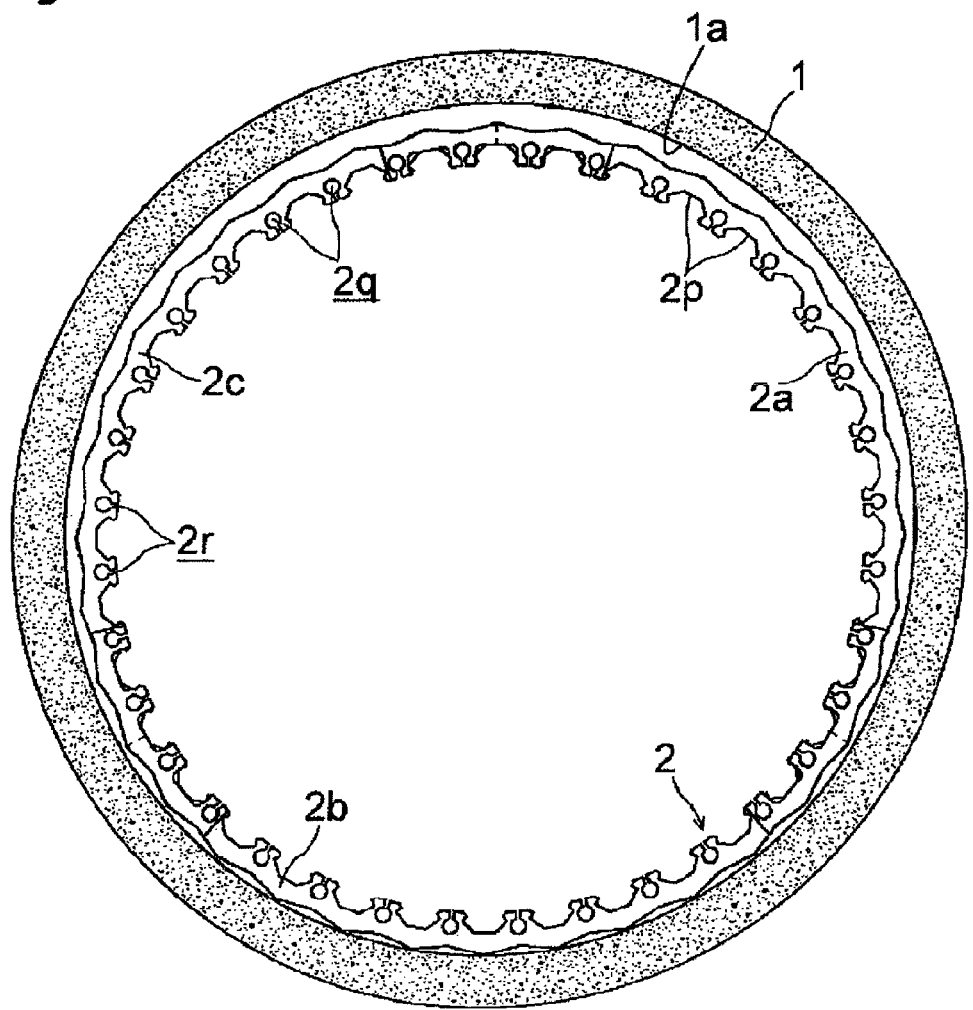
FIG. 11 An explanatory diagram of a conventional conduit repair method; a cross sectional diagram in the conduit-diameter direction, showing that the reinforcing member 2 is assembled inside the existing conduit 1.
Figure 12:
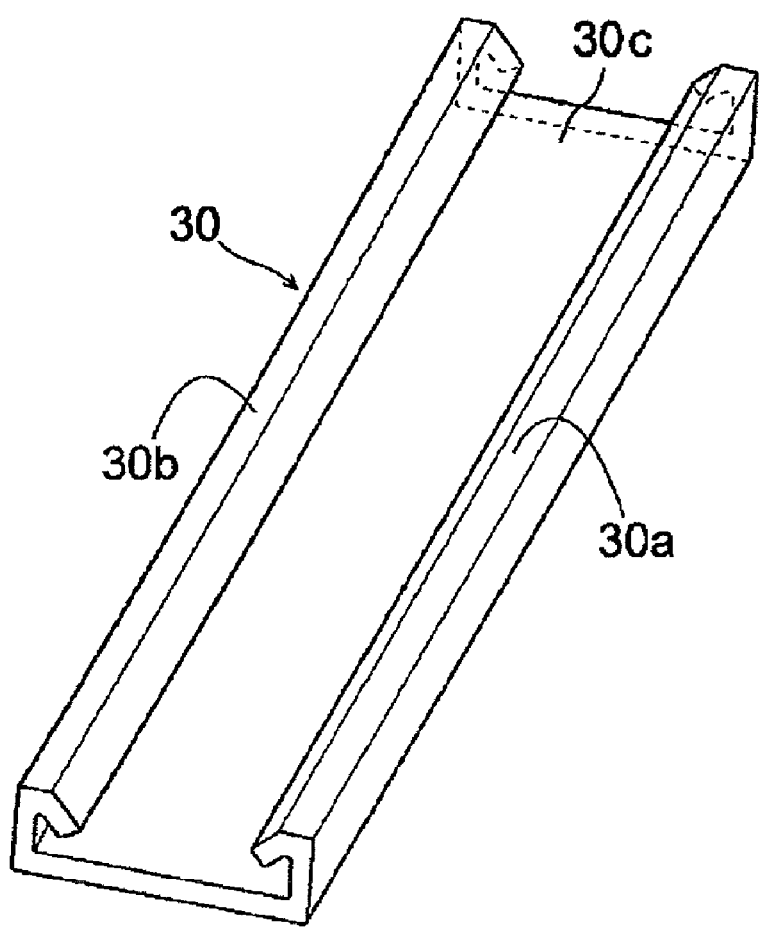
FIG. 12 An external perspective view of the inner face bar used in the conventional conduit repair method.
Figure 13:
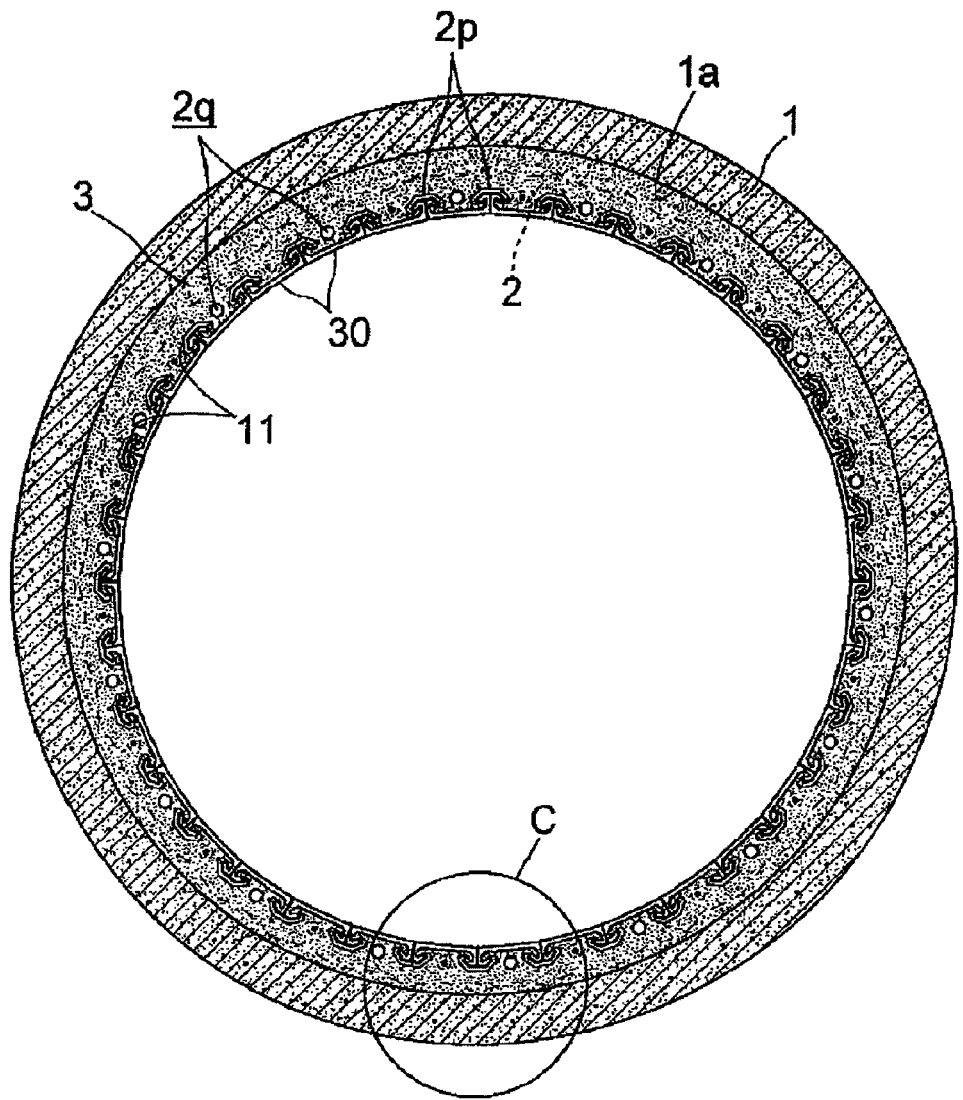
FIG. 13 A cross sectional diagram in the conduit-diameter direction of a conventional conduit repair structure.
Figure 14:
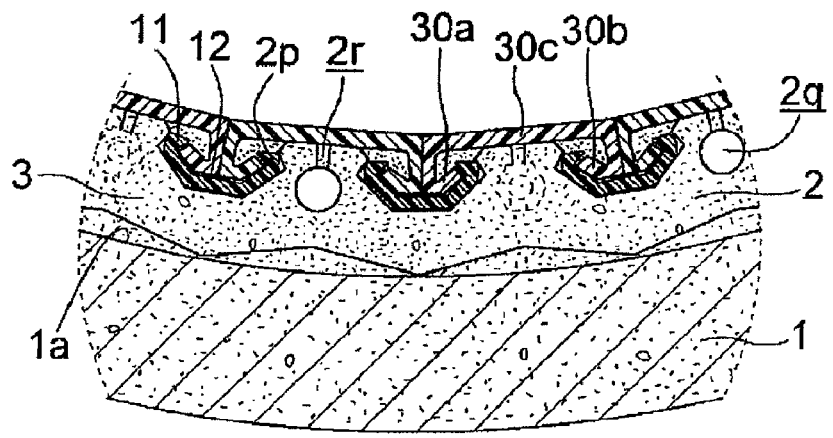
FIG. 14 An enlarged schematic diagram of the section C in FIG. 13.

1. Conduit
1a. Inner wall of conduit
2. Reinforcing member
2a, 2b, 2c. Divided reinforcing member
2p. Fitting section
2q. Through hole
2r. Notch
3. Curable filling material layer
10. Inner face bar
10a, 10b. Protruding section for fitting
10c. Body section
10d. Corner
11. Fixing bar
12. Sealing member
20. Inner face bar
20a, 20b Protruding section for fitting
20c. Engagement section
20d. Body section
20e. Center section
20f. Corner
30. Inner face bar
30a, 30b. Protruding section for fitting

The invention claimed is:

1. A conduit repair structure comprising
a hollow frame reinforcement body provided with a plurality of ring-shaped reinforcement members arranged in the conduit-longitudinal direction of the conduit at a certain interval, each ring-shaped reinforcement member consisting of a plurality of separate reinforcement members each having fitting sections at a predetermined pitch, and with a plurality of connecting members to mutually connect said plurality of reinforcement members;
a plurality of inner face members existing in the conduit-longitudinal direction of the conduit and forming a repaired surface inside the conduit by being mutually connected in the conduit-circumferential direction via the fitting sections of said reinforcement body, wherein the inner face member has a protruding section that is directly or indirectly fitted with the fitting section of said reinforcement member, and a body section that is integrally molded with the protruding section and an inner surface of the body section in the conduit-diameter direction constitutes said repaired surface; and
a filling-material layer comprising a curable filling material filled between said plurality of inner face members and an inner wall of the conduit;
characterized in that the cross section of the body section of said inner face member has a recessed part, and that a plurality of riblets are formed at least on a bottom of the repaired surface, wherein the riblets have an arcuate cross-sectional shape extending substantially across the body section.

2. The conduit repair structure according to claim 1, wherein the corners of the both ends in the conduit-circumferential direction of the inner face member have a rounded shoulder form over the entire length of the conduit-longitudinal direction of the conduit so that a groove is formed on the repaired surface.

3. The conduit repair structure according to claim 1, wherein the corners of the both ends in the conduit-circumferential direction of the inner face member are chamfered over the entire length of the conduit-longitudinal direction of the conduit so that a groove is formed on the repaired surface.

4. The conduit repair structure according to claim 1, wherein the inner face member has a width in the conduit-circumferential direction of two or more times of integral multiple of the pitch of the fitting section, and has at least one engagement section which protrudes outward of the conduit-diameter direction at the location corresponding to the fitting section between the protruding sections provided at both ends in the conduit-circumferential direction of the inner face member.

5. The conduit repair structure according to claim 1, wherein the maximum depth ($H_{max}$) of the recessed part formed on the body section of the inner face member relative to the hypothetical reference plane formed by connecting the both ends of the inner face member in the width direction is between 0.5 and 5.0 mm.

6. A conduit repair structure as recited in claim 1, wherein a bottom of the conduit is substantially flat.

7. An inner face member existing in the conduit-longitudinal direction to constitute a conduit repair structure by filling a curable filling material in the space between said inner face member and the inner wall of the conduit, comprising
a protruding section that is fitted with a fitting section arranged at a predetermined pitch in ring-shaped reinforcement members included in a hollow frame reinforcement body; and
a body section that is integrally molded with a second protruding section, wherein when the second protruding section is fitted with the fitting section of the reinforcement member, wherein an inner surface of the body section in the conduit-diameter direction constitutes a repaired surface;

characterized in that a cross section of the body section has a recessed part forming a riblet on the repaired surface, and that the repaired surface comprises a plurality of riblets formed by recessed parts of a plurality of body sections, wherein a bottom of the conduit and a bottom of the conduit repair structure are substantially flat.

8. A repair structure for an elongated conduit having a flow axis and an inner diameter with a substantially flat portion, the repair structure comprising:

a plurality of fixing bars having a substantially C-shaped cross section arranged parallel to each other along the flow axis; and a plurality of inner face bars having a bridge portion with an inner surface extending between first and second fixing portions, the inner face bars being configured to engage the fixing bars by insertion of the fixing portions into the C-shaped cross section such that the inner surface forms a new flowpath within the elongated conduit when assembled in the elongated conduit, wherein at least the inner face bars opposing the substantially flat portion of the elongated conduit form a riblet with an arcuate shape extending between the first and second fixing portions, the riblet having a depth $H_{max}$ so that frictional drag against flowing matter in the elongated conduit is reduced.

9. A repair structure as recited in claim 8, further comprising a curable filling material between the plurality of inner face bars and inner diameter of the conduit when assembled.

10. A repair structure as recited in claim 8, wherein $H_{max}$ is approximately 2 mm.

11. A repair structure as recited in claim 8, wherein $H_{max}$ is in a range from approximately 0.5 to 5 mm.

* * * * *